US008055984B2

(12) United States Patent
Gallezot et al.

(10) Patent No.: US 8,055,984 B2
(45) Date of Patent: Nov. 8, 2011

(54) FORWARD ERROR CORRECTION SCHEME COMPATIBLE WITH THE BIT ERROR SPREADING OF A SCRAMBLER

(75) Inventors: Rene Gallezot, La Colle sur Loup (FR); Rene Glaise, Nice (FR); Michel Poret, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 11/776,474

(22) Filed: Jul. 11, 2007

(65) Prior Publication Data

US 2008/0172589 A1 Jul. 17, 2008

Related U.S. Application Data

(63) Continuation of application No. 10/764,247, filed on Jan. 23, 2004, now Pat. No. 7,284,184.

(30) Foreign Application Priority Data

Jan. 30, 2003 (EP) .................................. 03368009

(51) Int. Cl.
*H03M 13/15* (2006.01)
(52) U.S. Cl. ....................................................... 714/785
(58) Field of Classification Search .................... 714/785
See application file for complete search history.

(56) References Cited

U.S. PATENT DOCUMENTS

| 3,771,126 | A | 11/1973 | Apple, Jr. |
| 3,775,746 | A | 11/1973 | Boudreau et al. |
| 4,993,029 | A | 2/1991 | Galbraith et al. |
| 5,533,033 | A | 7/1996 | Ratner |
| 5,727,083 | A | 3/1998 | Kelly et al. |
| 5,761,217 | A | 6/1998 | Soumiya et al. |
| 5,923,680 | A | 7/1999 | Brueckheimer et al. |
| 5,963,602 | A | 10/1999 | Aoki et al. |
| 6,003,151 | A | 12/1999 | Chuang |
| 6,377,643 | B1 | 4/2002 | Lee et al. |
| 7,260,767 | B2 * | 8/2007 | Bhattacharya et al. ....... 714/782 |
| 7,284,182 | B2 * | 10/2007 | Raahemi ....................... 714/758 |
| 7,298,694 | B2 * | 11/2007 | Kamiya et al. ................ 370/218 |
| 7,570,643 | B2 * | 8/2009 | Prasad et al. .................. 370/392 |

OTHER PUBLICATIONS

Tan, et al., "Correcting a Specified Set of Likely Error Patterns," IEEE Transactions of Information Theory, vol. 41, No. 1, Jan. 1995, pp. 272-279.
Lei, "The Syndrome Distribution of m-bit Error Patterns and the Analysis of ATM Forward Error Correction Codes," IEEE Transactions on Communications, vol. 43, No. 2/3/4, Feb./Mar./Apr. 1995, pp. 1392-1399.
Patapoutian, et al., "Event Error Control Codes and Their Applications," IEEE Transactions on Information Theory, vol. 47, No. 6, Sep. 2001; pp. 2595-2603.

* cited by examiner

*Primary Examiner* — Stephen Baker
(74) *Attorney, Agent, or Firm* — Joscelyn G. Cockburn; Khan Tran; Jennifer R. Davis

(57) ABSTRACT

A method for combining a simple forward error correction code i.e., a Hamming-like code with scrambling and descrambling functions is disclosed. Therefore, irrespective of the information to be transported, received data may be corrected, bit error spreading effects being handled, while providing desirable signal characteristics such as signal DC balance and enough signal transitions. The overhead introduced by the method is a modest increase over the original overhead of the 10 Gb Ethernet 64B/66B code.

16 Claims, 7 Drawing Sheets

Figure 7

FORWARD ERROR CORRECTION SCHEME COMPATIBLE WITH THE BIT ERROR SPREADING OF A SCRAMBLER

Pursuant to 35 USC §120, this continuation application claims priority to and benefit of U.S. Utility patent application Ser. No. 10/764,247, filed Jan. 23, 2004, now U.S. Pat. No. 7,284,184 on behalf of inventors Rene Gallezot, Rene Glaise, and Michel Poret, entitled "Forward error correction scheme compatible with the bit error spreading of a scrambler."

FIELD

The present invention relates to data communications and high speed transmission in general and is more particularly concerned with the correction of errors occurring on strings of data that need to be scrambled for transmission.

BACKGROUND

The transmission of information over very high-speed links requires, to enhance the transmission characteristics of the signal, that data strings to be forwarded have to be first encoded by the transmitting side. A particular desirable characteristic to acquire is that, irrespective of the information to be transported, the binary transmitted signal remains DC balanced. Also, transmitted signal must have enough transitions so as the receiver side can reliably recover a clock and can operate without any drift that would possibly result from long sequences of transmitted 1's or 0's.

A standard technique to achieve this objective is to scramble the transmitted data. Thus, various scramblers are specified by telecommunications standards. The one of the IEEE 802.3ae physical coding sublayer (PCS) broadly referred to as 10 Gb Ethernet (10 GbE), using a transmission coding technique known as 64B/66B, is based on polynomial: $x^{58}+x^{39}+1$.

On the other hand, the bit error rate (BER) of high-speed transmission links cannot generally be specified at a better rate than $10^{-2}$. Being given that any modern data communications equipment is now required to reach aggregate data throughput in a tera ($10^{12}$) bits per second (Tbps) range then, hundredths of links (link speed are typically in a 2.5 to 12.5 Giga or $10^9$ bits per second range) must be used irrespective of the actual implementation of a machine. Hence, it can easily be seen that errors are thus susceptible to occur at a rate well in excess of one every second. Even though link BER might be, in practice, better than what can be specified, designers of such data communications equipment such as Tbps routers and switches, are now forced to consider the use of forward error correction (FEC) a standard technique in which redundant bits of information are transmitted so a receiver can correct errors without requiring re-transmission.

Unfortunately, scrambling and FEC are somehow incompatible. It is well-known that scramblers multiply the number of error bits after de-scrambling. For example, 10 GbE scrambler, which has three terms, creates three errors after decoding for each real error occurring on a transmission link. Moreover, these three errors span on 59 bits corresponding to the degree of the polynomial. While a single error can easily be corrected with a simple FEC code e.g., a Hamming code, requiring few extra bits, much more redundancy is needed to handle the bit error spreading as a result of the scrambling. Also codes to use in this case, such as BCH codes, are complex to decode.

SUMMARY

Thus, it is a broad object of the invention to remedy the shortcomings of the prior art as described here above.

It is another object of the invention to provide a method and systems for transmitting data wherein a simple forward error correction code is combined with data scrambling to give required characteristics to the transmitted signal and to provide error correction capabilities.

It is a further object of the invention to provide a method and systems for recovering scrambled received data by using a simple forward error correction code after data descrambling, compatible with the bit error spreading of the scrambler.

The accomplishment of these and other related objects is achieved by a method of shortening a single-bit error correction/double-bit error detection code for detecting and correcting random bit errors in a digital transmission system wherein data is scrambled after said error detection/correction code is applied over a set of data and wherein said set of data is subsequently checked, after descrambling, for detecting and correcting transmission errors, to still obtain unique syndromes for said random bit errors after they have been multiplied as a result of said descrambling, said method of shortening including:
  obtaining unique syndromes for all combinations of said multiplied errors completely confined to a same said set of data;
  obtaining unique syndromes too for those combinations of said multiplied errors occurring at the end of said set of data and overlapping a next set of data,
    remembering the end unique syndrome types for allowing correction of said next set of data;
  obtaining syndromes for all combinations of said multiplied errors occurring at the beginning of said set of data that are at least unique per said end types;
  thereby, allowing to correct all said random bit errors in spite of their multiplication by said descrambling and whichever they stay confined to a single said set of data or are spreading on two consecutive said sets of data.

A method for transmitting data and associated redundant information allowing error detection and correction upon reception, said method comprising:
  selecting a set of data;
  computing forward error correction bits of said selected set of data according to a predetermined forward error correction code;
  merging said selected set of data and said forward error correction bits to form a packet;
  scrambling said packet; and,
  transmitting said scrambled packet,
  wherein said predetermined forward error correction code is determined as described above.

A method for recovering information encoded in a received data packet, said received data packet being scrambled and containing forward error correction bits, said method comprising:
  descrambling said received data packet;
  computing a syndrome of said descrambled received data packet;
  if said syndrome is an all-zero syndrome, extracting the data from said received data packet;
  else if said syndrome is not an all-zero syndrome, determining the state of a status flag,
    if said status flag is set to a first logical value, determining a number of bits in error in said received data packet according to said syndrome and, if the number of bits in error in said received data packet is equal to a degree of the scrambling polynomial, extracting the data from said received data packet and correcting said extracted data;

else if the number of bits in error in said received data packet is less than the degree of the scrambling polynomial, setting said status flag to a second logical value for one packet cycle and setting a value, associated to said status flag, to the degree of the scrambling polynomial minus the number of bits in error in said received data packet, extracting the data from said received data packet and correcting said extracted data;

else if said status flag is set to a second logical value, determining if the number of bits in error in said received data packet is equal to said value associated to said status flag and, if the number of bits in error in said received data packet is equal to said value associated to said flag, extracting the data from said received data packet and correcting said extracted data, correcting said extracted data being done according to a predetermined forward error correction code as described previously.

Further objects, features and advantages of the present invention will become apparent to ones skilled in the art upon examination of the following description in reference to the accompanying drawings. It is intended that any additional advantages be incorporated herein.

BRIEF DESCRIPTION OF THE DRAWINGS

FIG. 7 is the list of syndromes corresponding to all error cases as shown in FIG. 3, for polynomial of FIG. 6, assuming that packets to protect are up to 915-bit long.

DETAILED DESCRIPTION OF EMBODIMENTS

Figure 1:
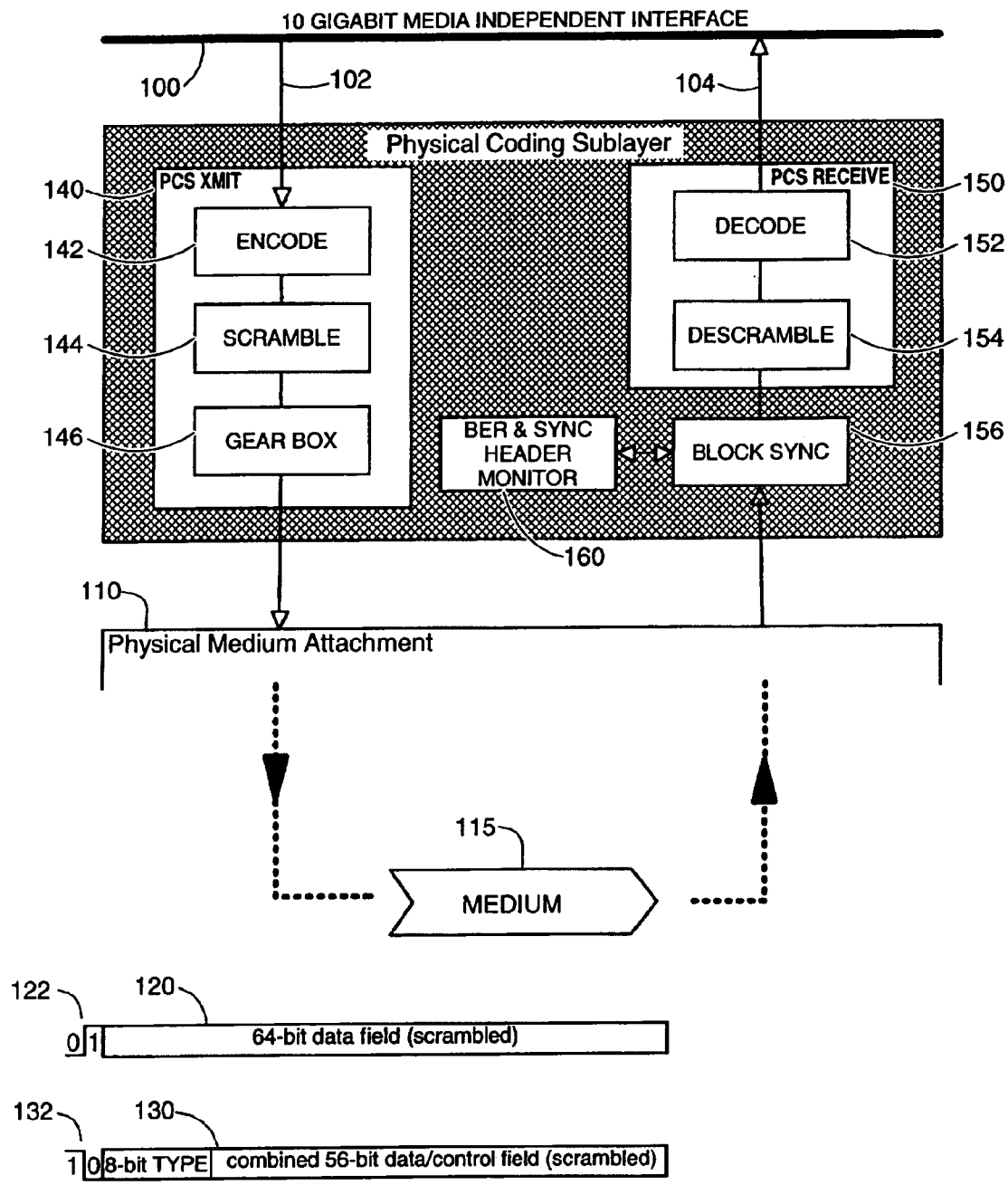
FIG. 1 briefly introduces IEEE 802.3ae physical coding sublayer and the associated scrambling and descrambling with polynomial x58+x39+1.

FIG. 1 briefly introduces IEEE 802.3ae PCS (physical coding sublayer) and the associated scrambling and descrambling with polynomial $x^{58}+x^{39}+1$. PCS upper interface (100) is the so-called '10 gigabit media independent interface' or XGMII which provides for the attachment of data communications equipment irrespective of the physical mode of transport of the streams of data to be forwarded (102) or received (104). Lower interface (110) provides for physical attachment to the transmission medium (115) e.g., a serial optical transmission. Data are transmitted in 66-bit blocks (120) comprised of a 64-b scrambled payload with a b'01' preamble (122). There are also 66-b control blocks (130) including an 8-bit type field preceded by a b'10' preamble. Both the block type and the remaining 56-bit data/control field of a control block are scrambled. Preambles, that allow block alignment, bypass the scrambler.

Transmit path (140) includes a scrambler (144) which improves the transmission characteristics so that sufficient transitions are present in the physical bit streams e.g., to make clock recovery possible at the receiver. The 64B/66B transmission code has a high transition density and is a run-length-limited code. The encode (142) and gear box (146) functions are necessary to map data and control characters to the blocks and to adapt formats. They are not necessary to the understanding of the invention thus, are not further described.

Receive path (150) includes a descrambler (154) to recover the original stream of bits. Synchronization on the preambles is achieved first (156). PCS also includes a function (160) that monitors the bit error rate over the transmission medium. There is a decode function (152) which is the counterpart of the transmit encode. Apart from the scrambler and descrambler, none of these functions need to be further described to understand the invention. They are shown here for the sake of accuracy on what is exactly the 10 GbE physical coding sublayer and to understand the context where the invention better applies.

Those skilled in the art will realize that although the invention is described in the particular context of 10 GbE it could be practiced as well in a different environment and will know, from the here after description, how to adapt it to other applications, especially for applications where a different scrambling polynomial would be used.

Figure 2:
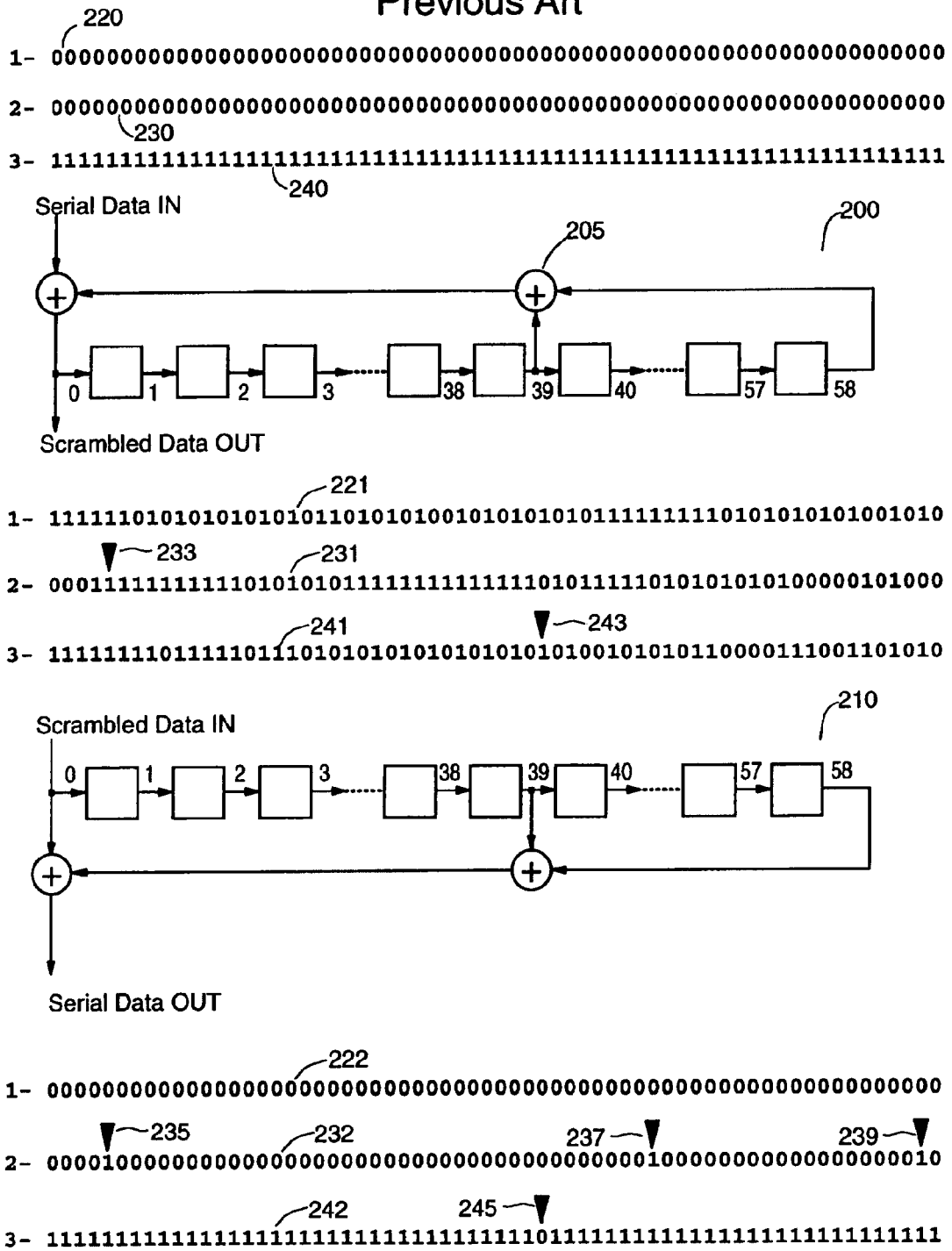
FIG. 2 shows the conventional representation of the 10 Gb Ethernet scrambler and descrambler.

FIG. 2 shows the conventional representation of the 10 GbE scrambler and descrambler, i.e. implementing according to the standard (see however the remark at the end of FIG. 3), the polynomial: $G(x)=1+X^{39}+X^{58}$ Scrambler (200) and descrambler (210) are linear feedback shift register (LFSR) to perform respectively, continuous division and multiplication of binary strings i.e., in an algebra modulo 2 modulo G(x), one bit at a time. Adders are XOR's such as (205). The two 58-bit shift registers have taps at indexes 0, 39 and 58 corresponding to the powers of the three terms of G(x), a primitive irreducible polynomial thus capable of generating a pseudo-random maximum length sequence. The sequence will repeat only after $2^{58}-1$ shifts, i.e. never for all practical purposes. Even though there would be one shift possible every 1 pico ($10^{-12}$) second, the time to wrap around the sequence would still be larger than the time that has elapsed since the creation of the universe.

Scramblers and descramblers have been in use for decades and are used to randomize strings of bits in order to obtain a better behavior of various electronic pieces of equipment mainly in the field of transmission. The chief applications being to allow that signals obtained be, on the average, DC balanced and to get enough transitions to be able to recover timing references from them. As an example of this, the first all-zero 64-bit sequence (220) gives, after scrambling, the 64-bit pattern (221) which is comprised of a good proportion of 0's and 1's (38 1's for 26 0's). After de-scrambling, the all-zero sequence is restored (222). Obviously, because of the randomness of the LFSR and of the length of the pseudo-random sequence no two identical input sequences are ever going to be encoded identically as this is illustrated here where the two successive all-zero input sequences (220, 230) gives different scrambled patterns (221, 231).

However, an undesirable well-known effect of scrambling is illustrated with the second example of an all-zero pattern (230) to transmit. This, after scrambling, gives pattern (231)

in which an error is assumed to flip 5th bit from left (233) when the signal is propagated through the transmission medium. Then, after descrambling, not only 5th bit is false but two more errors are created (237, 239) in the restored pattern (232). The three errors are spread at distances corresponding to the powers of G(x) terms. Indeed, scrambling multiplies the errors by a number corresponding to the number of terms of the polynomial in use, e.g. 3 with the 10 GbE polynomial.

Moreover, because errors are largely spread (errors thus span here on 59 bits), they are not generally going to stay confined to a single 64-bit block. For example, the all-one third pattern (240) gives, after scrambling, pattern (241) in which an error is assumed to affect the 36th bit from left (243). After de-scrambling only bit 36 (245) is going to be false in the current 64-bit block. However, the following transmitted block (not shown) will have two errors in it since errors are nevertheless multiplied and spaced by the de-scrambler as in previous example. Hence, implementing an error correcting code in an attempt to improve the bit error rate (BER) of transmissions using the 64B/66B 10 GbE code, for the reasons discussed in the background section, is problematic since each error occurring during the transmission is not only multiplied by three but is also largely spread.

Performing FEC is thus becoming much complicated and normally-requires many more redundant ECC bits and the use of sophisticated codes, such as a BCH (Bose-Chaudhuri-Hocquenghem). BCH codes are the type of codes that can be tailored to correct any occurrence of up to three errors in a string of scrambled bits. However, implementing a TEC code, e.g. a triple error correction code, at the expense of having to compute and decode a complex code adds to system cost and complexity, especially at the multi-Gbps transmission speeds considered by the invention.

Another approach is illustrated by U.S. Pat. No. 6,349,138 entitled 'Method and Apparatus for Digital Transmission Incorporating Scrambling and Forward Error Correction while Preventing Bit Error Spreading Associated with Descrambling'. The above patent manages to perform FEC after scrambling and before descrambling to get rid of its spreading effect and in order to continue to use a simple code such as a Hamming code capable of correcting single bit errors. However, the immediate consequence is that only part of the transmitted string of bits is actually scrambled and has the necessary properties for a good transmission. Redundant ECC bits that are calculated after scrambling must be concatenated as is to the scrambled string of bits.

Figure 3:
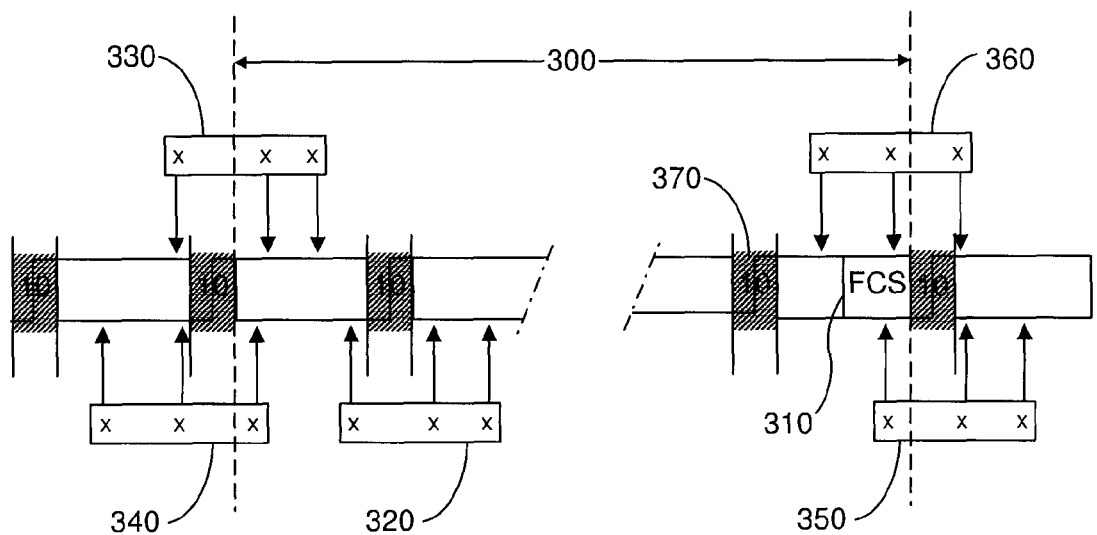
FIG. 3 reviews the cases of errors resulting of the error bit spreading and discusses the overhead introduced by forward error correction code.

The following description of the invention shows how a simple Hamming code can still be used on top of scrambling to circumvent the effect of error spreading. FIG. 3 reviews the cases of errors resulting from the error bit spreading and discusses the overhead introduced by FEC.

The invention assumes that FEC is performed at a physical level, above scrambling, so as to take care of the transmission errors on high speed links. Although FEC could be carried out with each transmitted packet, this would require having one redundant byte i.e., 8 bits, reserved per transmitted block. Along with the 2-bit preamble necessary for synchronization this would give an overhead of (2+8)/(64−8) or 18% for the 64B/66B code that would include a per-block FEC. Although this is better than the 25% overhead of the 8B/10B code often used for transmission on high speed links this fails meeting the objective of this code which is to require much less overhead i.e., 2/64 or 3% to operate. Hence, FEC should be devised so as to protect a series of blocks (300), rather than a single block, to keep overhead at a low value while allowing on-the-fly corrections of errors so as the transmission on high-speed links can indeed be considered error-free.

A common data unit often manipulated by modern data communications devices, such as switches and routers, is a 64-byte or 512-bit data packet requiring eight 64B/66B blocks of the kind shown in FIG. 1 (120). FEC applied at packet level i.e., over eight 8-byte or 64-bit blocks (300), requires 11 bits as this is discussed in detail in the following description of the invention. Hence, in this case, overhead becomes (8×2+11)/(512−11) or 5.4%, which is a modest increase over the original 3% overhead of the 64B/66B, while permitting single-bit transmission error corrections. Since, in practice more than a weird 11-bit field would likely have to be reserved in a 512-bit payload, a maximum of 6.4% may have to be considered if a 2-byte field would be reserved for practical considerations. Hence, FEC requires that redundant bits be taken from the payload under the form of a FCS (field check sequence) generally placed at the end of the packet (310).

Whichever packet size is considered, the kinds of errors that the invention assumes to be correctable are all shown in FIG. 3. The common case is when the three errors, resulting of the de-scrambling, are all confined to a single packet (320). Although, for a sake of accuracy, the 2-bit preambles are shown here (370), it must be understood that they are neither included in the scrambling nor are participating into FEC since they are only used for block synchronization by the physical coding sublayer shown in FIG. 1. The other error types are:

a single-bit error (340) preceded by a double-bit error in previous packet.

a double-bit error (330) preceded by a single-bit error in previous packet.

a single-bit error (350) followed by a double-bit error in next packet.

a double-bit error (360) followed by a single-bit error in next packet.

All these error cases, resulting from a single error occurring in the transmission links, are correctable according to the method of the invention further described.

It is worth noting here that FIG. 3 shows blocks and packet in a traditional way, i.e. with block preamble and beginning of packet (BoP) shown on the left. The most left bit is considered as the most significant bit and is transmitted first, from left to right, so the FCS is transmitted last with the end of packet (EoP). However, this is not consistent with the representation of the scrambler and descrambler by the standard as shown in FIG. 2. By referring to this figure one can notice that the MSB, i.e. $2^{58}$, is shown to be the most right bit of the shift register. By referring to the proper literature on the subject for example: 'Error-Correcting Codes', Peterson & Weldon, 2nd edition, The MIT press, 1972, and more specifically to chapter 7 'Linear Switching Circuit' it can easily be found that scrambler and de-scrambler of the 10 GbE standard are implementing the reciprocal of the polynomial quoted above i.e.: $G(x)=X^{58}+X^{19}+1$ and scrambler and de-scrambler should rather be indexed from 58 to 0, from left to right (so as the middle term is $2^{19}$). This does not change anything in practice. Both polynomials have exactly the same properties. However, the invention needs to consider the right indexing to be understood. Hence, the rest of the description assumes that the polynomial is actually $G(x)=X^{58}+X^{19}+1$ with, as usual, the most significant term on the left as with ordinary numbers.

Figure 4:
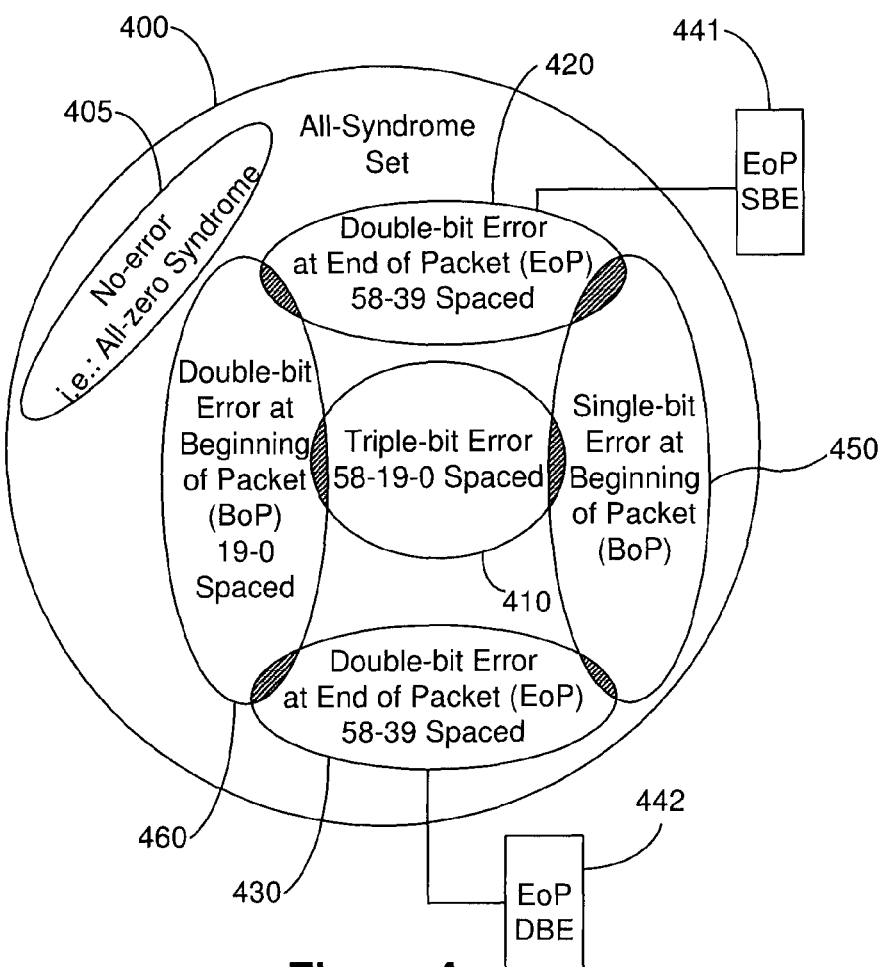
FIG. 4 discusses the properties of the correcting code which allows the correction of the kind of errors shown in FIG. 3.

FIG. 4 discusses the properties of the correcting code which allows the correction of the kind of errors shown in FIG. 3. In the following, a syndrome must be understood as the result of the packet FEC checking. If, e.g., FCS is 11-bits wide, then the syndrome is an all-zero (405) 11-bit binary vector when no error has occurred. Otherwise it is generally different from 0. The set of values (2048 with 11 redundant bits added for correction) is the syndrome (400).

First, all shifts of three-bit errors (410) spaced as G(x), i.e. at indexes 58, 19 and 0 and entirely contained in the packet payload (including FCS), must have unique syndrome values once a packet is FEC checked so that they can be unambiguously corrected. These errors are of the kind shown in FIG. 3 (320). When this happens no single-bit error or double-bit error respectively of the type (330) and (340) shown in FIG. 3 may have possibly occurred in previous packet.

Second, all single-bit (420) and double-bit (430) errors occurring at the end of a packet (EoP), corresponding respectively to cases (350) and (360) of FIG. 3 must give unique syndromes too (different of the above three-bit error syndromes) so they can be unambiguously corrected in current packet too. There are 58−19=39 single-bit errors of this category (350) possibly affecting the 39 most-right bits of a packet including FCS. Additionally, there are 19 double-bit errors of this kind affecting the 19 most-right bits of a packet. When this occurs (single-bit and double-bit errors occurring at the end of a packet) this must be remembered (441, 442) since next packet should have respectively, a double-bit or single-bit error at its beginning (BoP).

Third, all single-bit (450) and double-bit (460) errors occurring at the beginning of a packet, corresponding respectively to cases (330) and (340) of FIG. 3 must have unique syndromes. However, they need not to be unique versus all the others (first and second case above) and even together since, as mentioned above, one remembers for one packet cycle that an error at the end of previous packet has occurred and the type of this error, single (441) or double (442). In other words, since single and double-bit errors, having unique syndromes, have occurred in the previous packet, double or single-bit errors respectively, at the beginning of the next packet are to be expected. Thus, syndromes of such errors need not be unique. They only need to be unique per type (single or double).

Figure 5:
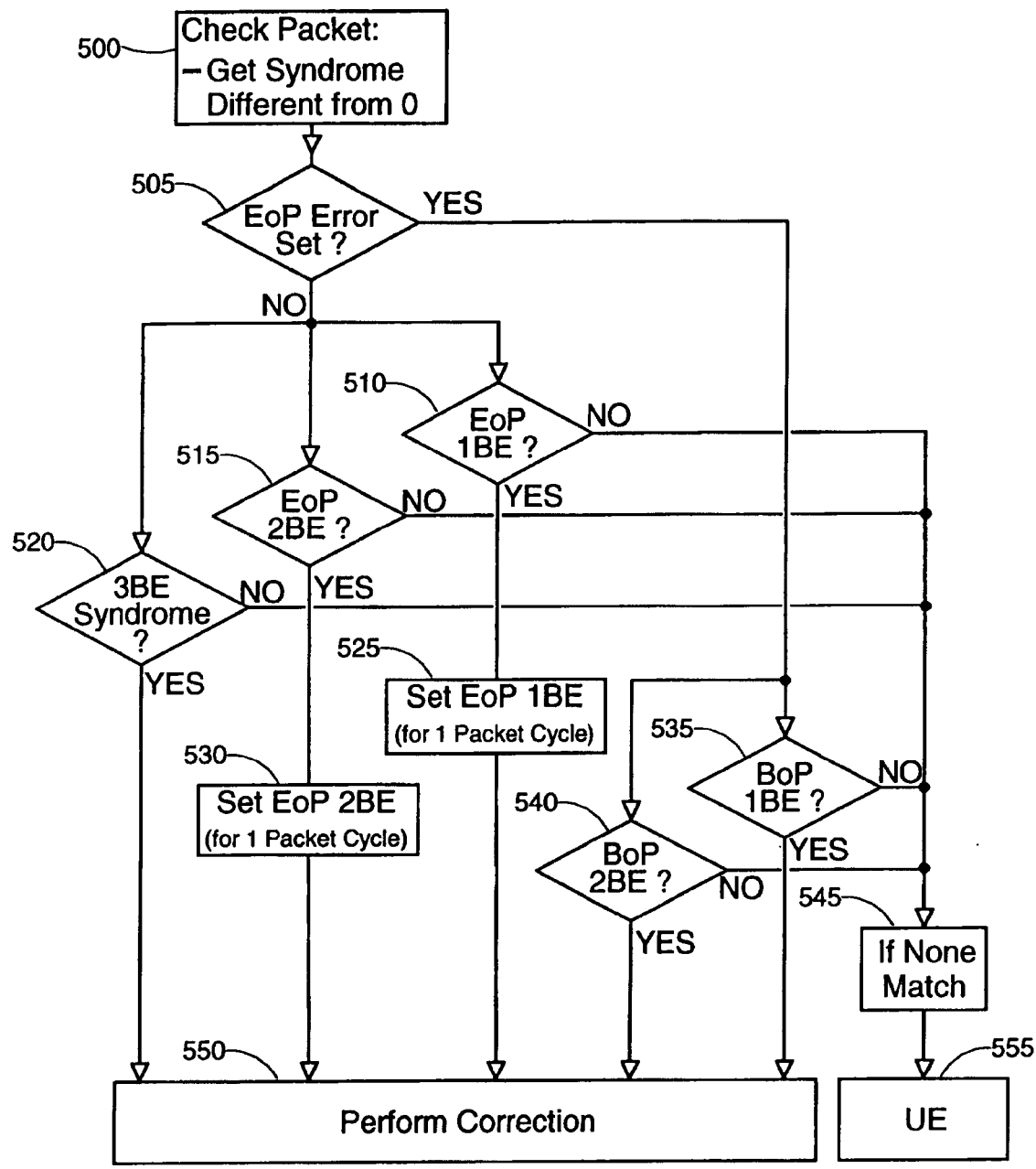
FIG. 5 is the state diagram of the method according to the invention.

Then, the set of syndromes must comply with what is shown in FIG. 4 so as state diagram of FIG. 5 hereafter can apply allowing correction after de-scrambling of all single-bit errors occurring during transmission of packets. The syndromes that do not fit must be considered uncorrectable errors. The corresponding packet should be flagged and/or discarded.

FIG. 5 is the state diagram of the method according to the invention. Each time a packet is received a syndrome is computed (500). If different from the all-zero syndrome a correction must be attempted. A first step is to check if an error has been found at the end of previous packet (505). If not, the syndrome is further checked. If it corresponds to a triple-bit error (520) a correction can be performed (550). If the syndrome however belongs to the ones of a double-bit error at the end of a packet (515), this is remembered (530) for the processing of the next packet (and only for next packet). The syndrome may also match the ones of the end-of-packet single-bit errors (510) in which case this is remembered (525) as with the end-of-packet double bit error. In both cases a correction is performed (550).

If, at step (505), a double-bit error or a single-bit error was found to have been corrected in the previous packet, then the current computed syndrome must be checked against respectively, the set of single-bit error syndromes (535) and the set of double-bit errors syndromes (540) that occur at the beginning of a packet (BoP). If there is a match a correction can be performed (550). If none of the above match (545), the syndrome does not fit the model of errors. An uncorrectable error (555) is therefore detected.

Figure 6:
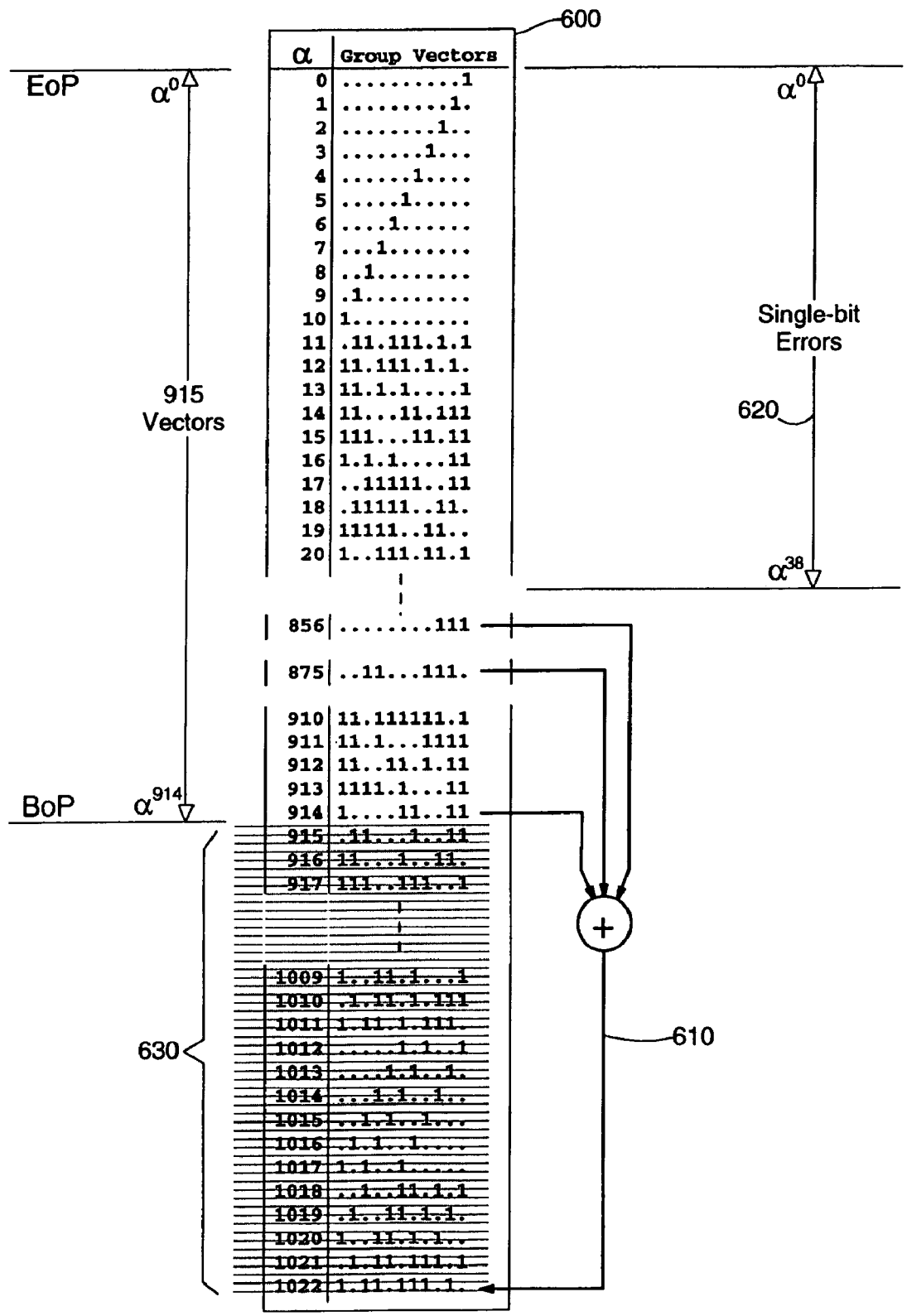
FIG. 6 explains how a forward error correction code can be derived that complies with the requirements discussed in previous figures especially, with FIG. 4.

FIG. 6 explains how an FEC code can be derived that complies with the requirements discussed in previous figures, especially with FIG. 4. The invention is hereafter exemplified using the following code generator polynomial: $G(x)=(X+1)$ $(X^{10}+X^9+X^7+X^6+X^4+X^1+1)$. This type of polynomial, which is the product by (X+1) of a primitive irreducible polynomial, here of degree 10, is known to produce a SEC/DED (single error correction/double error detection) type of code. Because of the multiplication by (X+1), vectors of the code are all odd-weight so that it is easy to split the syndromes in two disjoint sets. Single bit error syndromes are odd while double bit error syndromes are all even. This property has been extensively used to implement what is referred to as an odd-weight extended Hamming code. On this, and on error correction in general, one may refer for example to 'Error-Correcting Codes for Semiconductor Memory Applications: A State-of-the-Art Review', C. L. Chen and M. Y. Hsiao, IBM Journal of Research and Development, Volume 28, Number 2, March 1984.

A list of irreducible polynomials in a binary GF (Galois Field) of the kind corresponding to the right term of G(x), and much theory on the field of error correction, can be found in the book already cited above, i.e. in 'Error-Correcting Codes', Peterson & Weldon, 2nd edition, The MIT press, 1972. The degree-10 right polynomial chosen to illustrate the invention is listed, in appendix C of this book, in octal notation, as '3323'. The reason of the choice of this particular polynomial will become clear in the following description of the invention.

From G(x) it is possible to form a finite group under multiplication of odd-weight vectors (600), ranked from 0 to 1022 and noted $\alpha^0$ to $\alpha^{1022}$, comprising $2^{10}-1$ or 1023 vectors, a number which corresponds to the degree of the right term of G(x). Vectors at beginning and end of the multiplicative group plus some intermediate vectors are shown. As mentioned, they are all comprised of an odd number of ones. For the sake of readability, 0's are replaced by a dot (.) in the binary vectors shown.

In this group, since it is a multiplicative group, the following holds: $\alpha^X \times \alpha^Y = \alpha^{X+Y}$ modulo 1023. However, it is still possible to define an addition of three vectors (even though this is not a field) that always returns a vector of the group so that $\alpha^X + \alpha^Y + \alpha^Z = \alpha^W$. This is always true because group is made of all possible odd-weight vectors. Adding three vectors together gives again an odd vector that belongs to the group. Moreover, following holds too: $\alpha^{X+n} + \alpha^{Y+n} + \alpha^{Z+n} = \alpha^{W+n}$. As an example of this, one can easily verify from what is listed in (600) that $\alpha^0 + \alpha^3 + \alpha^5 = \alpha^{1012}$ and that $\alpha^{X1} + \alpha^4 + \alpha^6 = \alpha^{1013}$ and so on.

Hence, it is possible to compute the addition of the three group vectors that corresponds to the terms of the scrambler polynomial, namely 58, 19 and 0. Adding $\alpha^{58} + \alpha^{19} + \alpha^0$ gives $\alpha^{166}$ and, $\alpha^{58+856} + \alpha^{19+856} + \alpha^{0+856} + \alpha^{166+856} = \alpha^{1022}$ (610) the last vector of the group. Therefore there are 1022−(166−1) i.e.: 857 successive combinations of triple-bit errors, spaced as scrambler polynomial powers, that give unique syndromes spanning from $\alpha^{166}$ to $\alpha^{1022}$. The polynomial chosen has been selected to maximize the range of usable vectors. Among all possibilities of primitive irreducible polynomials listed in Peterson and Weldon book mentioned previously, polynomial '3323' (in octal notation) the right term of G(x) i.e.: $X^{10}+X^9+X^7+X^6+X^4+X^1+1$, is a good choice since it gives a low value for the addition of three vectors of the group spaced as 58, 19 and 0. Choosing another polynomial gives a higher value for the addition of $\alpha^{58}+\alpha^{19}+\alpha^0$, reducing the range of possible unique combinations as this is further discussed.

It is worth noting here that this results from the fact that all Galois Fields which can be generated with different primitive irreducible polynomials, are isomorphic in the mathematical sense of this term. That is, all fields of degree n contain all $2^n-1$ non-zero vectors. They just differ by the order in which these vectors appear in the field. The vector addition table thus varies greatly from one choice of polynomial to another. This behavior is carried over to the multiplicative group obtained after multiplication by X+1, resulting from the fact that there are better choices to obtain a large range of three-bit error combinations that have unique syndromes.

The above requires that code generated with suggested polynomial $G(x)=(X+1)(X^{10}+X^9+X^7+X^6+X^4+X^1+1)$ be shortened so combinations of three errors cannot return a vector greater than $\alpha^{1022}$ for the reason that the next value would be $\alpha^0$ (since the group is a finite cyclic group). Indeed, the EoP single-bit errors, i.e. (350) in FIG. 3, need to be unique according to the invention. As they are using the 39 starting vectors (620) of the multiplicative group they cannot be used by the three-bit error combinations. This is obtained by excluding the use of group vectors (630) beyond $\alpha^{914}$ (the 915th vector of the group), i.e. the 857 three-bit error combinations +58, the degree of the polynomial.

As far as the two-bit errors are concerned, the addition of two vectors of the group does not belong to the multiplicative group (on the contrary of the addition of three vectors). It returns an even-weight vector that neither belongs to the three-bit error syndromes nor to the single-bit error syndromes which exceeds the requirements discussed in FIG. 4. Therefore, by limiting the code to the protection of packets of up to 915 bits it is possible to correct all errors, after scrambling, according to the method of FIG. 5. The impact of shortening the code to obtain this result is however minimized by choosing a polynomial where the sum of three vectors, spaced as in scrambler polynomial, i.e. 58, 19, and 0, corresponds to a low displacement (610) in the multiplicative group so fewer vectors have to be excluded (630).

Figure 7:
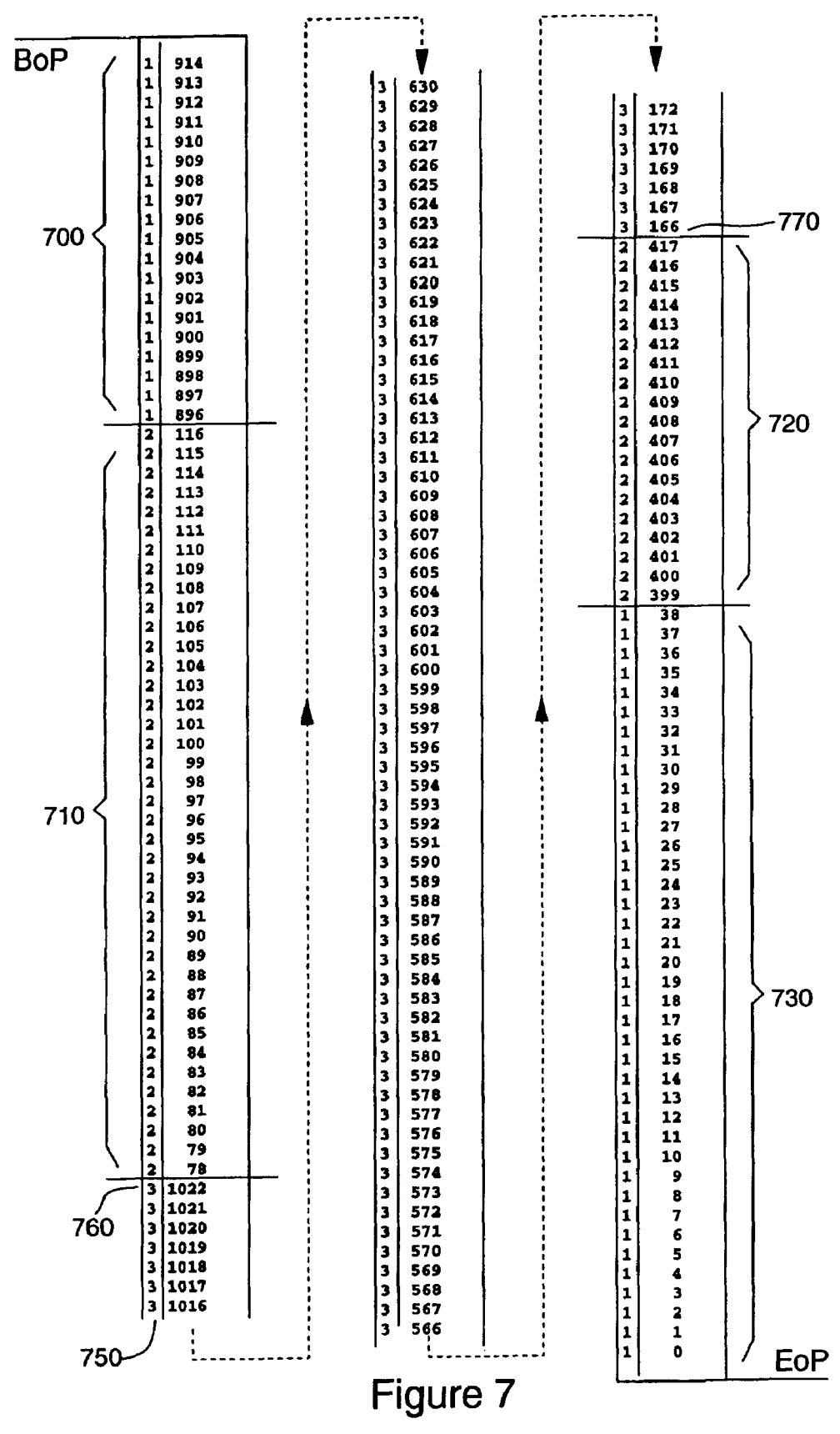
Figure 8:
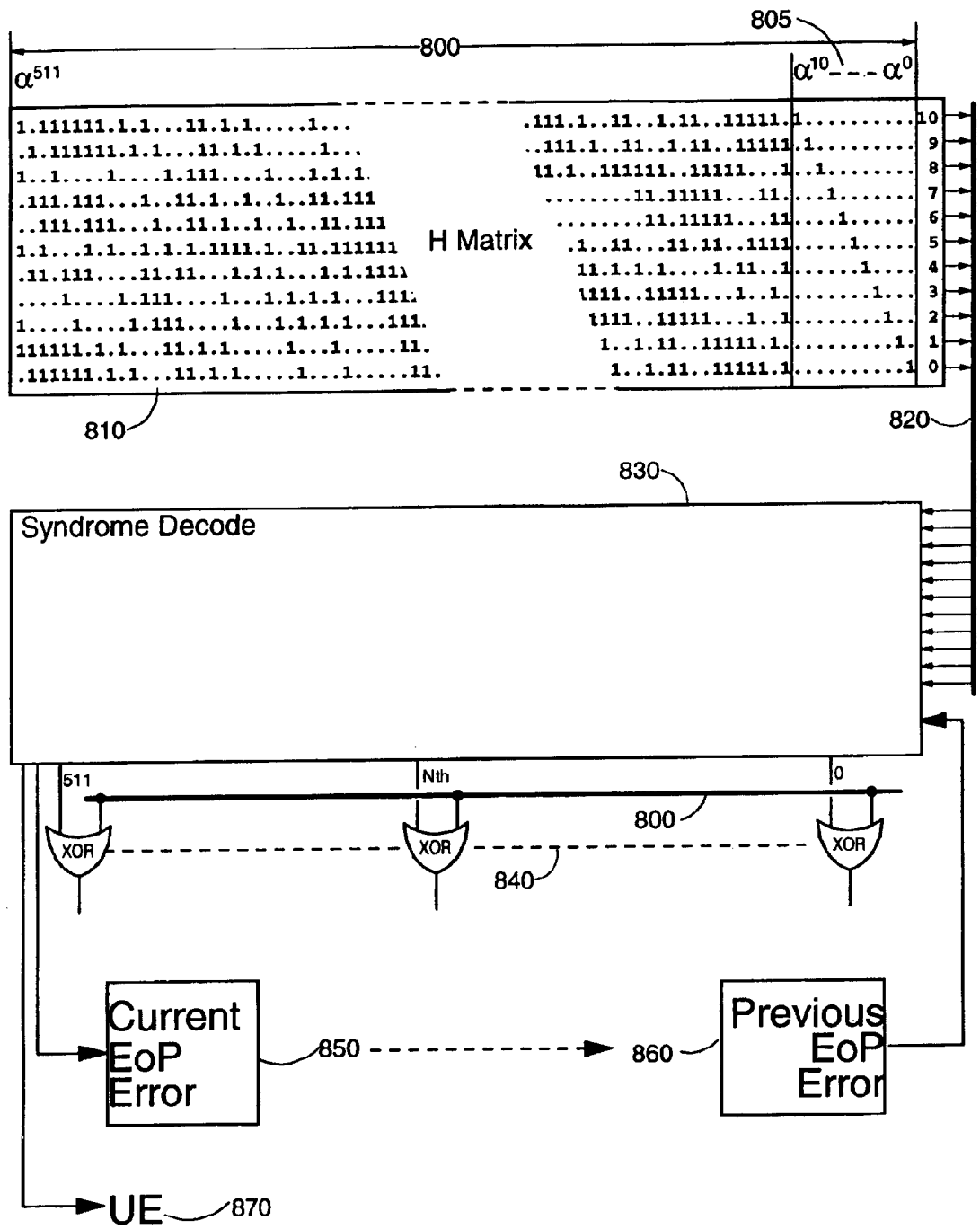
FIG. 8 illustrates an implementation example of the invention.

FIG. 7 is the list of syndromes corresponding to all error cases shown in FIG. 3, for polynomial of FIG. 6, assuming that packets to protect are up to 915-bit long. The code can obviously be further shortened to adapt to any lower packet size as shown in FIG. 8 here after. The single-bit and triple-bit error syndromes are listed according to their rank into the multiplicative group of FIG. 6. The left column (750) is the number of bits in error. The double-bit error syndromes (710) and (750) do not belong to the multiplicative group of FIG. 6. Their ranks listed are taken out of the dual multiplicative group made of all even vectors (not shown). Hence, ranks of double-bit errors cannot and need not be compared to the odd multiplicative group. However, double-bit errors at the beginning of packet (710) and double-bit errors at the end of packet, can be, and should be compared to each other, to check that they are unique allowing to unambiguously correct all double-bit errors.

From the BoP there are 19 single-bit errors (700). These errors correspond to case (340) of FIG. 3. They are followed by 39 double-bit errors corresponding to case (330) of FIG. 3. After which starts (760) all the shifts of triple-bit errors, a down sequence from rank 1022 to rank 166 (770). There are again 19 double-bit errors at the end of packet (720) corresponding to case (360). Finally, there are 39 EoP single-bit errors (730). EoP single-bit errors (730), all triple-bit errors from (760) to (770) and double-bit errors (720) have unique syndromes and can be corrected directly. Single-bit errors at the beginning of packet (700) are unique alone but have duplicates in the set of triple-bit errors which is permitted by the algorithm of FIG. 5.

Therefore, all errors resulting from a single-bit error during the transmission of 64B/66B blocks can be corrected after de-scrambling. All syndromes of errors that do not fit in list of FIG. 7 are uncorrectable errors. Since, in this particular example, there are 2047 ($2^{11}-1$) possible non-zero syndrome combinations and 973–19=954 unique combinations used for the corrections (the first 19 BoP syndromes have all a duplicate in the set of triple-error syndromes) the difference, 1093 combinations, may serve to detect directly uncorrectable errors according what is shown in FIG. 5 (555). More uncorrectable errors are possibly detected by the algorithm of FIG. 5 since, even though a syndrome matches one of the BoP single and double error syndromes, a corresponding error must have been found in previous packet to allow a correction. If this is not the case an uncorrectable error is detected too.

FIG. 8 shows, as an example among numerous possibilities, an implementation of the invention. The choice of a particular implementation is highly dependent on the performance required and of the technology available. Communications devices, for which the invention is devised, are generally implemented in high-speed ASIC's (application specific integrated circuits) that may be comprised of millions of logic gates and latches. To achieve the necessary level of performance with a cost-performance, relatively slow, technology as CMOS (complementary metal oxide semiconductor), logic designers tend to favor wide buses and parallel processing of information data. Hence, the particular implementation of FIG. 8 assumes that, e.g., a 512-bit wide packet (800) is checked with a large block of combinatorial logic implemented with exclusive OR gates (XOR's) and shown here under the form of a matrix (810), the so-called H-Matrix of the code, where 1's are XOR inputs. The matrix corresponds to what is shown in FIG. 6, however further shortened, for illustrating the case of a typical 64-byte packet. Logic block (810) thus allows generation of an 11-bit syndrome (820) which is decoded (830) to perform a correction if necessary. Correction consists of inverting the bits found in error. Input data, i.e. the whole packet which is applied (800) over the matrix that generates the syndrome (820), is also applied to the series of XOR's (840) to invert the bits found in error by the decode of the syndrome (830). As discussed previously EoP errors must be remembered (850), for one packet cycle, so that the information can be used for the next packet for correction (860) when necessary. Also, decoding the syndrome allows the finding of the uncorrectable errors (870).

Implementation is not further described since it uses techniques and methods well known from the art of logic design, especially the design of the ASIC's used for communications devices. The generation of the eleven ECC bits on the transmit side is trivial. Generation is equivalent to checking except that the eleven ECC bits (805) are set to 0 so that the matrix (810) returns the FCS (instead of the syndrome) to be inserted at the end of the message as shown in FIG. 3 before it is forwarded. Again, all of these are standard practices well known from the art.

Finally, those skilled in the art will recognize that, although the invention is described for the particular case of the 10 GbE scrambler it is straightforward to adapt it to all other primitive scrambler polynomials. A list of such primitive polynomials, up to degree 300, can be found in 'Built-In Test for VLSI, Pseudorandom Techniques', Paul H. Bardell and al., John Wiley & Sons, 1987. It must also be understood that the choice of a code to correct the errors after scrambling can be different from the one suggested while still practicing the invention. Especially, if longer or shorter packets must be protected, different polynomial may be chosen so as to adapt the number of necessary redundant bits to a particular application of the invention.

Also, the particular implementation of FIG. 8 does not preclude a completely different approach. Because the invention only requires that code be shortened, generation and checking can still be performed cyclically, with a state machine, that would compute FCS and syndrome n-bit or n-byte at a time instead of using a single combinatorial block of logic.

While the invention has been particularly shown and described with references to an embodiment, it will be understood by those skilled in the art that various changes in both form and detail may be made therein without departing from the scope and spirit of the invention.

Having thus described our invention, what we claim is as follows:

What is claimed is:

1. A method of correcting errors in data packets, the method comprising:
   computing a syndrome for a first packet to determine if a first error exists in the first packet; and
   if the first error exists in the first packet:
      correcting the first error;
      determining if a second error exists in a second packet, wherein the second error is a multiplied error of the first error; and
      correcting the second error.

2. The method of claim 1, further comprising receiving the first and second packets.

3. The method of claim 1, further comprising decoding the first packet when the first packet is scrambled via a scrambler polynomial.

4. The method of claim 1, further comprising determining that the first error is a triple-bit error.

5. The method of claim 1, further comprising determining the first error is an uncorrectable error.

6. The method of claim 1, further comprising determining the second error is an uncorrectable error.

7. The method of claim 1, further comprising determining that the first error is a double-bit error at an end of the first packet.

8. The method of claim 7, further comprising remembering that the first error is a double-bit error to correct the second error, wherein the second error is a single-bit error.

9. The method of claim 1, wherein the computing the syndrome for the first packet comprises computing the syndrome from forward error correction bits for the first packet, the forward error correction bits being selected via a shortened group of vectors from an odd-weight group of vectors.

10. The method of claim 9, further comprising scrambling the first packet via scrambler polynomial $X^{58}+X^{19}+1$, wherein the shortened group of vectors is based upon terms of the scrambler polynomial.

11. The method of claim 1, further comprising determining that the first error is a single-bit error at an end of the first packet.

12. The method of claim 11, further comprising remembering that the first error is a single-bit error.

13. The method of claim 12, wherein correcting the second error comprises computing a second syndrome for the second packet to check against a set of single-bit error syndromes.

14. The method of claim 1, wherein the computing the syndrome for the first packet comprises computing a syndrome of an H-Matrix of shortened group of vectors.

15. The method of claim 14, wherein the shortened group of vectors comprises odd-weight vectors $\alpha^0$ through $\alpha^{914}$ from the group of odd-weight vectors $\alpha^0$ through $\alpha^{1022}$.

16. The method of claim 14, wherein the shortened group of vectors corresponds to code generating polynomial $G(x)= (X+1)(X^{10}+X^9+X^7+X^6+X^4+X^1+1)$.

* * * * *